(12) United States Patent
Mori

(10) Patent No.: US 11,117,499 B2
(45) Date of Patent: Sep. 14, 2021

(54) VEHICLE SEAT

(71) Applicant: Toyota Jidosha Kabushiki Kaisha, Toyota (JP)

(72) Inventor: Kazuya Mori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/665,454

(22) Filed: Oct. 28, 2019

(65) Prior Publication Data
US 2020/0139859 A1 May 7, 2020

(30) Foreign Application Priority Data

Nov. 2, 2018 (JP) .............................. JP2018-207211

(51) Int. Cl.
*B60N 2/30* (2006.01)
*B60N 2/42* (2006.01)
*B60N 2/427* (2006.01)

(52) U.S. Cl.
CPC ........... *B60N 2/305* (2013.01); *B60N 2/3015* (2013.01); *B60N 2/42* (2013.01); *B60N 2/427* (2013.01); *B60N 2/42709* (2013.01)

(58) Field of Classification Search
CPC .............................. B60N 2/305; B60N 2/3015
USPC ........ 297/14, 216.1, 216.13, 216.14, 216.15, 297/331, 334, 340; 296/65.05
See application file for complete search history.

(56) References Cited

U.S. PATENT DOCUMENTS

| | | | | |
|---|---|---|---|---|
| 945,208 | A * | 1/1910 | Arter ......................... | A47C 9/06 297/14 |
| 1,355,005 | A * | 10/1920 | Schechter .......... | B61D 33/0085 297/14 X |
| 3,501,200 | A * | 3/1970 | Ohtaseizo ............ | B60N 2/4228 297/452.19 |
| 3,544,164 | A * | 12/1970 | Ohtaseizo .......... | B60N 2/42709 297/452.2 |
| 4,145,081 | A * | 3/1979 | Withers ............... | B60N 2/4221 297/216.14 |
| 4,527,828 | A * | 7/1985 | Groce .................. | B60N 2/3031 297/14 X |
| 4,580,832 | A * | 4/1986 | Maruyama ............... | A47C 9/06 297/14 |

(Continued)

FOREIGN PATENT DOCUMENTS

| JP | 2008-052347 A | 3/2008 |
|---|---|---|
| JP | 2017-149331 A | 8/2017 |
| JP | 2017-149351 A | 8/2017 |

*Primary Examiner* — Rodney B White
(74) *Attorney, Agent, or Firm* — Dinsmore & Shohl LLP

(57) ABSTRACT

A vehicle seat includes a seat main body and a hinge member. The seat main body is disposed in a state facing to a vehicle rear side. A seat back of the seat main body is attached to a vehicle body side vertical wall portion of a passenger compartment front portion. An end portion at the vehicle rear side of a seat cushion of the seat main body can be flipped up. One end portion of the hinge member is fixed to an end portion at the vehicle front side of the seat cushion and another end portion is rotatably coupled to a passenger compartment floor portion. The hinge member is provided with a weakened portion that, during a vehicle front collision in a state in which the seat main body is unfolded, plastically deforms and allows movement of the seat cushion toward the vehicle front side.

20 Claims, 7 Drawing Sheets

(56) References Cited

U.S. PATENT DOCUMENTS

| | | | | |
|---|---|---|---|---|
| 4,902,069 | A * | 2/1990 | Lehnert | B64D 11/0691 297/14 |
| 5,156,437 | A * | 10/1992 | Hayakawa | B60N 2/071 297/335 |
| 5,156,438 | A * | 10/1992 | Hayakawa | B60N 2/071 297/335 |
| 5,158,338 | A * | 10/1992 | Hayakawa | B60N 2/01591 297/335 |
| 5,195,802 | A * | 3/1993 | Hayakawa | B60N 2/366 297/334 |
| 5,320,411 | A * | 6/1994 | Sera | A47C 11/005 297/331 |
| 5,498,052 | A * | 3/1996 | Severini | B60N 2/20 297/14 X |
| 5,529,378 | A * | 6/1996 | Chaban | B60N 2/01508 297/331 |
| 5,671,948 | A * | 9/1997 | Susko | B60N 2/3047 297/14 X |
| 5,791,729 | A * | 8/1998 | McCormick | A47C 9/06 297/14 |
| 5,800,015 | A * | 9/1998 | Tsuchiya | B60N 2/0715 297/331 X |
| 6,012,771 | A * | 1/2000 | Shea | B60N 2/36 296/65.05 |
| 6,231,101 | B1 * | 5/2001 | Kamida | B60N 2/01583 297/14 X |
| 6,582,003 | B2 * | 6/2003 | Fourrey | B60N 2/3011 296/64 |
| 6,655,724 | B1 * | 12/2003 | Yoshino | B60N 2/3013 297/216.1 |
| 6,709,053 | B1 * | 3/2004 | Humer | B60N 2/4228 297/216.1 |
| 6,742,841 | B1 * | 6/2004 | Soditch | A47C 7/56 297/335 |
| 6,807,690 | B1 * | 10/2004 | Satterfield | A47K 3/282 297/14 |
| 6,883,854 | B2 * | 4/2005 | Daniel | B60N 2/01541 297/14 X |
| 6,883,868 | B2 * | 4/2005 | Yoshida | B60N 2/065 297/340 X |
| 6,916,057 | B2 * | 7/2005 | Teich | B60N 2/3045 297/331 X |
| 6,935,691 | B1 * | 8/2005 | Sasaki | B60N 2/0812 297/331 X |
| 6,974,184 | B1 * | 12/2005 | Moffa | B60N 2/3011 297/14 |
| 7,040,702 | B2 * | 5/2006 | Yamada | B60N 2/3009 297/331 X |
| 7,086,696 | B2 * | 8/2006 | Yudovich | B60N 2/3047 297/335 |
| 7,195,302 | B2 * | 3/2007 | Jovicevic | B60N 2/2809 297/14 X |
| 7,237,837 | B2 * | 7/2007 | Queveau | B60N 2/3011 297/15 |
| 7,252,320 | B2 * | 8/2007 | Tsujibayashi | B60N 2/01583 296/65.05 |
| 7,270,371 | B2 * | 9/2007 | Adragna | B60N 2/2209 297/331 X |
| 7,293,835 | B2 * | 11/2007 | Yudovich | B60N 2/0155 296/65.05 |
| 7,374,242 | B2 * | 5/2008 | Champ | B60N 2/3031 297/331 X |
| 7,431,366 | B2 * | 10/2008 | Sankrithi | B60P 3/423 296/26.01 |
| 7,517,008 | B2 * | 4/2009 | Ebel | B60N 2/3031 296/65.05 |
| 7,559,594 | B2 * | 7/2009 | McMillen | B60N 2/206 297/14 X |
| 7,568,764 | B2 * | 8/2009 | Harper | B60N 2/045 297/14 |
| 7,578,537 | B2 * | 8/2009 | Baetz | B60N 2/3013 296/65.09 |
| 7,611,200 | B2 * | 11/2009 | Jovicevic | B60N 2/2209 297/331 X |
| 7,658,447 | B2 * | 2/2010 | Soditch | A47C 7/56 297/335 |
| 7,712,829 | B2 * | 5/2010 | Park | B60N 2/0881 297/234 |
| 7,780,234 | B2 * | 8/2010 | Grable | B60N 2/305 297/331 |
| 7,832,770 | B2 * | 11/2010 | Bradley | B60R 22/00 280/808 |
| 7,862,114 | B2 * | 1/2011 | Kalina | B60N 2/4249 297/216.1 X |
| 7,901,005 | B2 * | 3/2011 | Khan | B60N 2/3013 297/331 |
| 7,976,093 | B2 * | 7/2011 | McBride | B60N 2/3047 297/14 X |
| 8,104,834 | B2 * | 1/2012 | Moegling | B60N 2/20 297/331 X |
| 8,123,293 | B2 * | 2/2012 | Marriott | B60N 2/4221 297/331 X |
| 8,152,240 | B2 * | 4/2012 | Yamada | B60N 2/3013 297/321 |
| 8,376,442 | B1 * | 2/2013 | Brantley | B60N 2/43 296/65.09 |
| 8,444,223 | B2 * | 5/2013 | Moegling | B60N 2/3013 297/331 |
| 8,449,012 | B2 * | 5/2013 | Seibold | B60N 2/986 297/14 X |
| 8,573,674 | B2 * | 11/2013 | Otsuka | B60N 2/0818 297/340 X |
| 8,646,840 | B2 * | 2/2014 | Stojanovic | B60N 2/12 297/331 |
| 8,864,227 | B2 * | 10/2014 | Funke | B60N 2/42709 297/216.13 |
| 8,967,663 | B2 * | 3/2015 | Seki | B60N 2/42 297/216.1 X |
| 9,114,742 | B2 * | 8/2015 | Nakanishi | B60N 2/42709 |
| 9,308,836 | B2 * | 4/2016 | Hausler | B60N 2/3031 |
| 9,573,490 | B1 * | 2/2017 | Poniatowski | B60N 2/305 |
| 9,616,778 | B1 * | 4/2017 | Bates | B60N 2/36 |
| 9,623,775 | B2 * | 4/2017 | Kanai | B60N 2/06 |
| 9,744,932 | B1 * | 8/2017 | Faruque | B60R 21/16 |
| 9,789,840 | B2 * | 10/2017 | Farooq | B60R 21/214 |
| 9,873,354 | B2 * | 1/2018 | Poulos | B60N 2/10 |
| 9,919,626 | B2 * | 3/2018 | Goodhall | B60N 2/3031 |
| 9,937,837 | B2 * | 4/2018 | Tsuji | B60N 2/64 |
| 10,065,536 | B2 * | 9/2018 | Poniatowski | B60N 2/2245 |
| 10,259,358 | B2 * | 4/2019 | Mizobata | B60N 2/42745 |
| 10,336,220 | B2 * | 7/2019 | Sera | B60N 2/242 |
| 10,457,166 | B2 * | 10/2019 | Matsui | B60N 2/3013 |
| 10,471,920 | B2 * | 11/2019 | Dry | B60R 21/233 |
| 10,518,733 | B2 * | 12/2019 | Dry | B60R 21/207 |
| 10,604,036 | B2 * | 3/2020 | Kimura | B60N 2/12 |
| 10,625,704 | B2 * | 4/2020 | Dry | B60R 21/233 |
| 10,752,199 | B2 * | 8/2020 | Chen | B60R 21/2338 |
| 10,882,455 | B2 * | 1/2021 | Sturza | B60N 2/3011 |
| 10,899,256 | B2 * | 1/2021 | Brown | B60N 2/015 |
| 2003/0184129 | A1 * | 10/2003 | Honda | B60N 2/3043 297/14 |
| 2004/0032155 | A1 * | 2/2004 | Yamada | B60N 2/3047 297/331 |
| 2004/0212237 | A1 * | 10/2004 | Epaud | B60N 2/065 297/331 |
| 2006/0152055 | A1 * | 7/2006 | Yudovich | B60N 2/3047 297/331 |
| 2006/0214459 | A1 * | 9/2006 | Kammerer | B60N 2/3013 296/65.09 |
| 2006/0214488 | A1 * | 9/2006 | Clauss | A47C 7/563 297/340 |
| 2006/0284464 | A1 * | 12/2006 | Soditch | B60N 2/309 297/331 |
| 2007/0252404 | A1 * | 11/2007 | Muck | B60N 2/22 296/65.16 |
| 2008/0215350 | A1 | 9/2008 | Nishiyama et al. | |
| 2009/0058159 | A1 * | 3/2009 | Okuda | B60N 2/682 297/340 |

(56) References Cited

U.S. PATENT DOCUMENTS

| | | | |
|---|---|---|---|
| 2009/0236880 A1* | 9/2009 | Villeminey | B60R 7/043 297/340 X |
| 2009/0295185 A1* | 12/2009 | Abe | B60N 2/3065 296/65.09 |
| 2010/0253110 A1* | 10/2010 | Yamada | B60N 2/62 296/65.08 |
| 2012/0126592 A1* | 5/2012 | Kaessner | B60N 2/42736 297/216.1 |
| 2012/0175930 A1* | 7/2012 | Jovicevic | B60R 22/26 297/331 |
| 2014/0265499 A1* | 9/2014 | Pacolt | B60N 2/20 297/337 |
| 2015/0108813 A1* | 4/2015 | Muller | B60N 2/2245 297/362.11 |
| 2017/0217351 A1* | 8/2017 | Jaradi | B60N 3/063 |
| 2017/0341543 A1* | 11/2017 | Fujisawa | B60N 2/3011 |
| 2018/0272977 A1* | 9/2018 | Szawarski | B60N 2/04 |
| 2019/0193665 A1* | 6/2019 | Jimenez | B60R 21/2338 |
| 2019/0275979 A1* | 9/2019 | Dry | B60R 21/2338 |
| 2020/0039388 A1* | 2/2020 | Onoyama | B60N 2/0292 |
| 2020/0079254 A1 | 3/2020 | Mori et al. | |
| 2020/0139860 A1* | 5/2020 | Sakurai | B60N 2/242 |
| 2020/0254864 A1* | 8/2020 | Bergstrom | B60L 50/64 |
| 2020/0307496 A1* | 10/2020 | Jimenez | B60R 21/231 |
| 2020/0377052 A1* | 12/2020 | Youssef-Agha | B60R 21/2338 |
| 2020/0384939 A1* | 12/2020 | Rutgersson | B60R 21/216 |
| 2020/0391688 A1* | 12/2020 | Schroeder | B60R 21/239 |
| 2020/0391691 A1* | 12/2020 | Fischer | B60R 21/207 |
| 2020/0406853 A1* | 12/2020 | Fischer | B60R 21/233 |

* cited by examiner

VEHICLE SEAT

CROSS-REFERENCE TO RELATED APPLICATION

This application is based on and claims priority under 35 USC 119 from Japanese Patent Application No. 2018-207211 filed on Nov. 2, 2018, the disclosure of which is incorporated by reference herein.

BACKGROUND

Technical Field

The present disclosure relates to a seat for a vehicle.

Related Art

Japanese Patent Application Laid-Open (JP-A) No. 2017-149331 discloses a structure in which an airbag is provided between a front seat and a rear seat in a vehicle in which the front seat may, by being oriented to the vehicle rear side, be put into a state opposing the rear seat. JP-A Nos. 2017-149351 and 2008-052347 disclose structures in which, similarly to JP-A No. 2017-149331, an airbag is provided that protects an occupant of a rear seat in a state in which a front seat is opposing the rear seat.

The technologies disclosed in the documents mentioned above all relate to structures that protect an occupant of the rear seat among opposing seats. There is scope for improvement in regard to effectively protecting an occupant of the front seat during a front collision of a vehicle.

SUMMARY

In consideration of the circumstances described above, an object of the present disclosure is to provide, for a vehicle seat disposed in a state facing to a vehicle rear side, a vehicle seat that may effectively protect an occupant during a vehicle front collision.

A vehicle seat according to a first aspect of the present disclosure includes: a seat main body that is disposed in a state facing a vehicle rear side, a seat back of the seat main body being attached to a vehicle body side vertical wall portion of a passenger compartment front portion, and a vehicle rear side end portion of a seat cushion of the seat main body being capable of being flipped up; and a hinge member of which one end portion is fixed to a vehicle front side end portion of the seat cushion and another end portion is rotatably coupled to a passenger compartment floor portion, the hinge member, during a vehicle front collision in a state in which the seat main body is unfolded, plastically deforming and allowing movement of the seat cushion toward the vehicle front side.

In the vehicle seat according to the first aspect of the present disclosure, the seat back of the seat main body is attached to the vehicle body side vertical wall portion of the passenger compartment front portion, and the vehicle rear side end portion of the seat cushion of the seat main body is structured to be capable of flipping up. The vehicle seat includes the hinge member of which the one end portion is fixed to the vehicle front side end portion of the seat cushion and the another end portion is rotatably coupled with the passenger compartment floor portion. Therefore, the seat cushion may be flipped up by the vehicle rear side end portion of the seat cushion being lifted up and the another end portion of the hinge member rotating relative to the passenger compartment floor portion.

At a time of a vehicle front collision in the state in which the seat main body is unfolded (the seat cushion is not flipped up), the hinge member is structured so as to plastically deform and allow movement of the seat cushion toward the vehicle front side. Therefore, if a front collision occurs in a state in which an occupant is sitting on the vehicle seat, at least a portion of a collision load may be absorbed by the hinge member plastically deforming. In addition, when the seat cushion moves toward the vehicle front side, the seat back is put into an upright state along the vehicle body side vertical wall portion. Thus, a case of the occupant riding up along the seat back toward the vehicle upper side may be suppressed.

In a vehicle seat according to a second aspect of the present disclosure, in the first aspect, a weakened portion is formed at an upper portion of the hinge member, the weakened portion being easier to deform than other portions of the hinge member.

In the vehicle seat according to the second aspect of the present disclosure, the weakened portion formed at the upper portion of the hinge member at the side thereof at which the seat cushion is disposed is plastically deformed during a vehicle front collision. Thus, movement of the seat cushion toward the vehicle front side is allowed.

In a vehicle seat according to a third aspect of the present disclosure, in the second aspect, the weakened portion is partially defined by a cut-out formed in the upper portion of the hinge member.

In the vehicle seat according to the third aspect of the present disclosure, the weakened portion is partially defined by the cut-out being formed in the upper portion of the hinge member at the side at which the seat cushion is disposed. Hence, the seat cushion side end portion of the hinge member in which the cut-out is formed plastically deforms during a vehicle front collision, which allows the seat cushion to move toward the vehicle front side.

In a vehicle seat according to a fourth aspect of the present disclosure, in the second aspect, during a vehicle front collision of the vehicle in the state in which the seat main body is unfolded, the hinge member rotates toward the vehicle front side, plastically deforms at the weakened portion, and allows movement of the seat cushion toward the vehicle front side.

In a vehicle seat according to a fifth aspect of the present disclosure, in the second aspect, a base portion is fixed to the passenger compartment floor portion, wherein the hinge member includes: a cushion side attachment portion that is fixed to the seat cushion; and a base side attachment portion that is rotatably coupled to the passenger compartment floor portion, via the base portion.

In a vehicle seat according to a sixth aspect of the present disclosure, in the fifth aspect, the base side attachment portion extends diagonally toward a vehicle upper-rear side from the base portion to the seat cushion, and the weakened portion is provided at an upper end portion of the base side attachment portion.

In a vehicle seat according to a seventh aspect of the present disclosure, in the sixth aspect, the cushion side attachment portion includes: an inclined portion that projects in a vehicle width direction from a vehicle front side end portion of the base side attachment portion and extends in a direction of extension of the base side attachment portion; and a linear portion that extends to the vehicle rear side along a lower face of the seat cushion from an upper end portion of the inclined portion.

In a vehicle seat according to a eighth aspect of the present disclosure, in the second aspect, the weakened portion is a region with reduced thickness that is provided at the upper portion of the hinge member.

In a vehicle seat according to a ninth aspect of the present disclosure, in the first aspect, an insertion hole and a long hole are formed in an end portion of the hinge member at the side thereof at which the seat cushion is disposed, a fastening member being inserted into the insertion hole for fastening the hinge member to the seat main body, and the long hole extending toward the vehicle front side from the insertion hole and being narrower than the fastening member. During a vehicle front collision, the hinge member is plastically deformed by the long hole being pushed to be widened by the fastening member moving toward the vehicle front side, and the hinge member allows movement of the seat cushion toward the vehicle front side.

In the vehicle seat according to the ninth aspect of the present disclosure, the insertion hole is formed in the end portion of the hinge member at the side at which the seat cushion is disposed. The hinge member is fastened to the seat cushion (the seat main body) by the fastening member being inserted into the insertion hole. The long hole that is narrower than the fastening member is formed toward the vehicle front side from the insertion hole of the hinge member. Therefore, during a vehicle front collision, the fastening member moves toward the vehicle front side while plastically deforming the long hole by pushing to widen the long hole, which allows the seat cushion to move toward the vehicle front side relative to the hinge member.

As described above, according to the vehicle seat according to the first aspect of the present disclosure, an occupant of a vehicle seat that is disposed in a state facing to the vehicle rear side may be effectively protected during a vehicle front collision.

According to the vehicle seat according to the second aspect of the present disclosure, the seat cushion may be more assuredly allowed to move to the vehicle front side during a vehicle front collision.

According to the vehicle seat according to the third aspect of the present disclosure, the seat cushion may be allowed to move toward the vehicle front side during a vehicle front collision by a simple structure in which the cut-out is simply formed in the hinge member.

According to the vehicle seat according to the ninth aspect of the present disclosure, the seat cushion may be allowed to move toward the vehicle front side during a vehicle front collision by a simple structure in which the long hole is simply formed in the hinge member.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
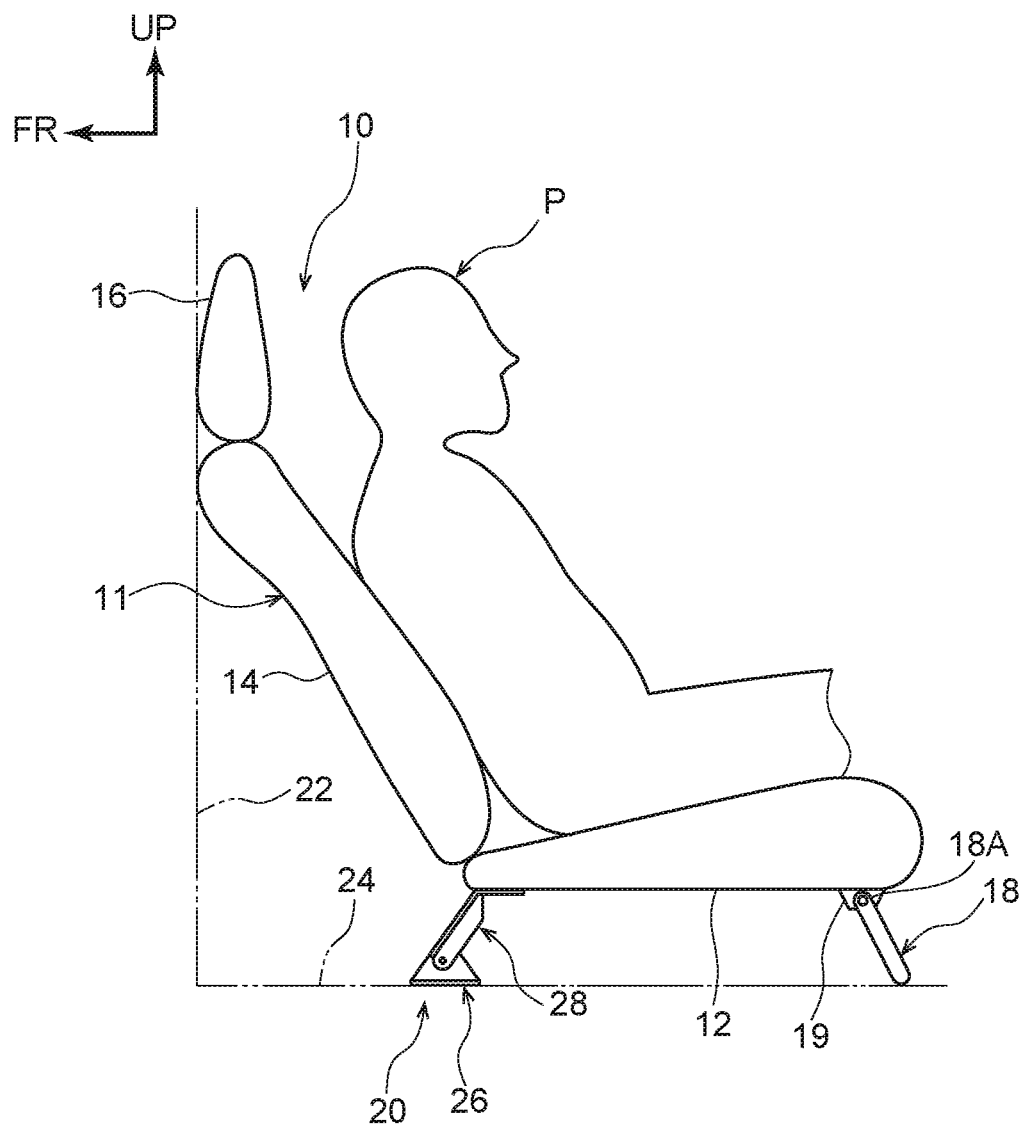
FIG. 1 is a side view showing overall structure of a vehicle seat according to a first exemplary embodiment.

A vehicle seat 10 according to a first exemplary embodiment is described with reference to the drawings. An arrow FR and an arrow UP that are shown where appropriate in the drawings indicate, respectively, a vehicle front direction and a vehicle upper direction. Herebelow, where descriptions are given simply using the directions front, rear, upper, lower, left and right, unless otherwise specified, these represent the front and rear in the vehicle front-and-rear direction, upper and lower sides in the vehicle vertical direction, and left and right when facing forward.

As shown in FIG. 1, the vehicle seat 10 of the present exemplary embodiment is disposed in a passenger compartment front portion in a state facing to the vehicle rear side. In the following descriptions, a direction in which an occupant P sitting on the vehicle seat 10 faces is referred to as the seat front side, and a direction along the vehicle width direction is referred to as the seat width direction. The vehicle according to the present exemplary embodiment is a "self-driving vehicle" that is capable of autonomous running. The vehicle is configured to be switchable between a manual driving mode in which the occupant P conducts driving manually and a self-driving mode in which the vehicle runs autonomously.

Figure 2:
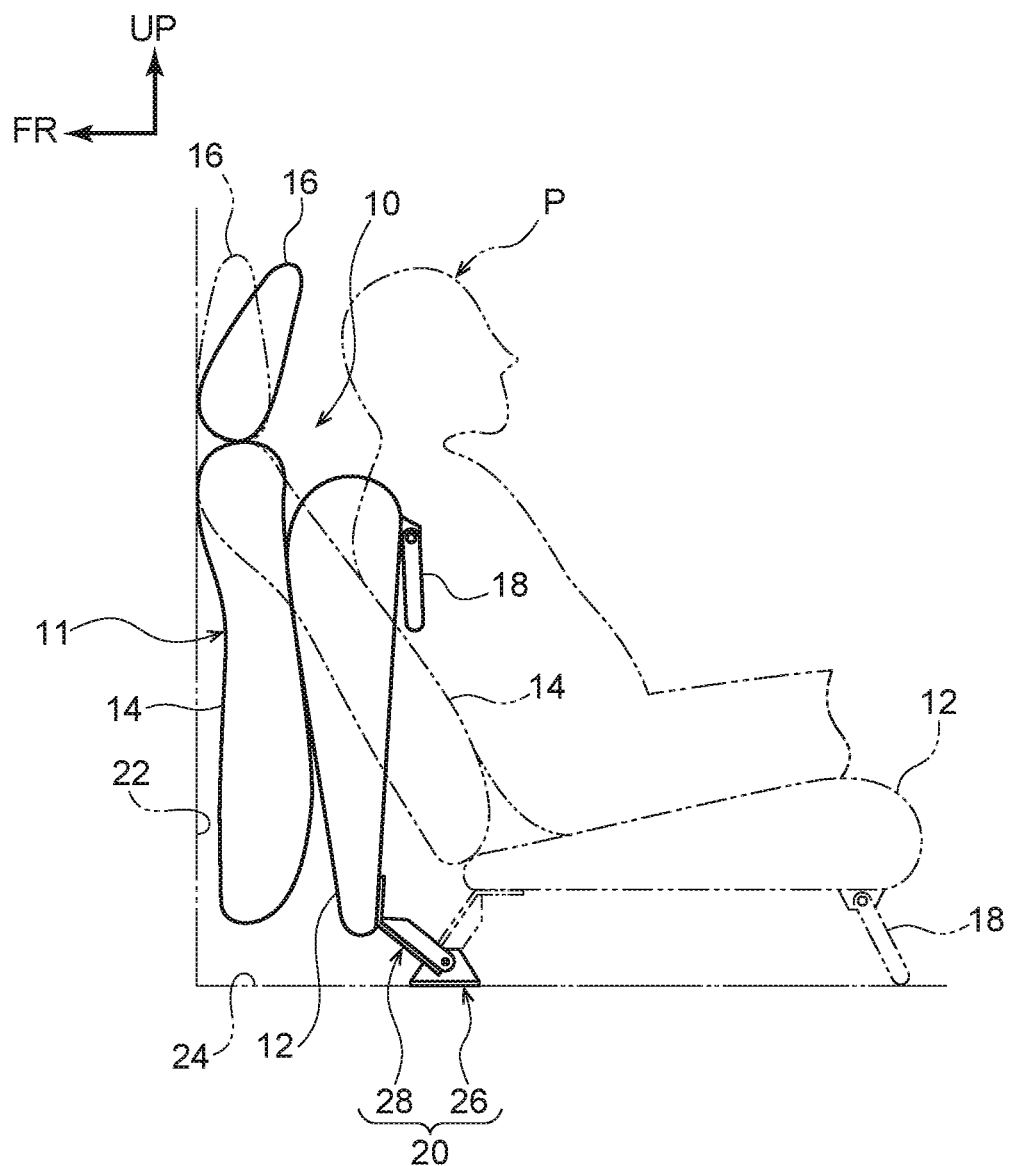
FIG. 2 is a side view showing a state in which the vehicle seat is tipped up from the state in FIG. 1.

The vehicle seat 10 is provided with a seat main body 11. The seat main body 11 includes a seat cushion 12, a seat back 14 and a headrest 16. The vehicle seat 10 is structured as a "tip-up" seat that can be moved from an unfolded state, which is shown in FIG. 1, to a folded state, which is shown in FIG. 2.

The seat cushion 12 is structured to be capable, in the state in which the seat main body 11 is unfolded, of supporting the buttock area and thigh area of the occupant P from the seat lower side. Front side leg members 18 are coupled to a seat front side end portion (a vehicle rear side end portion) of the seat cushion 12. Rear side leg members 20 are coupled to a seat rear side end portion (a vehicle front side end portion) of the seat cushion 12. The front side leg members 18 and rear side leg members 20 are described in more detail below.

The seat back 14 is rotatably coupled to a seat rear side end portion of the seat cushion 12. In the state in which the seat main body 11 is unfolded, the seat back 14 extends to the seat upper side from the seat cushion 12 and is structured to be capable of supporting the back area of the occupant P from the seat rear side.

An upper portion of the seat back 14 is attached to the vehicle body side. More specifically, an attachment bracket that is not shown in the drawings is provided at a vehicle body side vertical wall portion 22 that is provided in the passenger compartment front portion. The seat back 14 is attached to this attachment bracket to be rotatable relative thereto in the vehicle front-and-rear direction. Accordingly, as shown in FIG. 2, when the seat front side end portion of the seat cushion 12 is flipped up and the vehicle seat 10 is tipped up, the seat back 14 goes from the unfolded state into an upright state. The vehicle body side vertical wall portion 22 may be, for example, a dash panel or the like.

As shown in FIG. 1, the headrest 16 is provided at a seat upper side end portion of the seat back 14. The headrest 16 is structured to be capable of supporting the head area of the occupant from the seat rear side.

Now, the front side leg members 18 and rear side leg members 20 are described. The front side leg members 18 are formed by a pipe-shaped member being inflected. Thus, viewed in the vehicle front-and-rear direction in the state in which the seat main body 11 is unfolded, the front side leg members 18 are formed in a substantial "U" shape of which the upper side is open.

Two end portions 18A of the front side leg member 18 are rotatably attached to corresponding attachment portions 19 provided at a lower face of the seat cushion 12. In the present exemplary embodiment, the front side leg members 18 are structured to be rotatable together in the seat front-and-rear direction between the position depicted in FIG. 1 and the position depicted by solid lines in FIG. 2. Rotation of the front side leg members 18 toward the vehicle front side beyond the position shown in FIG. 1 is locked by a locking mechanism that is not shown in the drawings.

Figure 3:
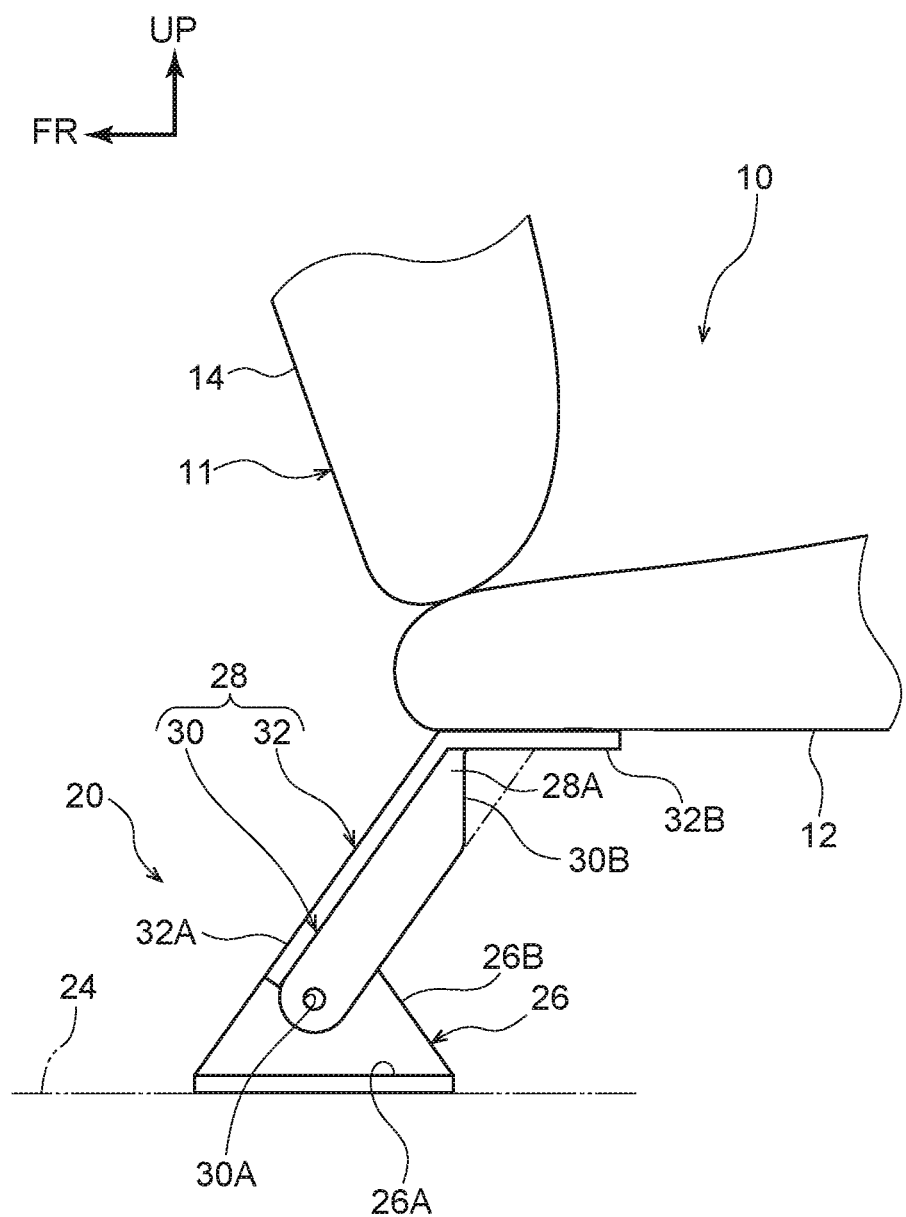
FIG. 3 is a magnified side view showing a magnification of principal elements of the vehicle seat according to the first exemplary embodiment.

As shown in FIG. 3, each rear side leg member 20 includes a base portion 26 and a hinge member 28. In the present exemplary embodiment, the rear side leg members 20 are provided as a pair at left and right, being provided at corresponding seat width direction end portions of the seat cushion 12.

Viewed in the vehicle front-and-rear direction, the base portion 26 of each rear side leg member 20 is formed in a substantial "L" shape. The base portion 26 includes a first face portion 26A and a second face portion 26B. The first face portion 26A extends along a floor panel 24 that serves as a passenger compartment floor portion. The second face portion 26B projects to the seat upper side from an end portion at the seat width direction inner side of the first face portion 26A. The first face portion 26A is formed in a substantially rectangular shape in plan view, with a plate thickness direction in the seat vertical direction. The first face portion 26A is fixed to the floor panel 24 by a fastening member that is not shown in the drawings, or the like. Viewed in the vehicle width direction, the second surface portion 26B is formed in a substantially triangular shape. The hinge member 28 is rotatably pivoted at the second surface portion 26B.

One end portion of the hinge member 28 is fixed to a seat rear side end portion of the seat cushion 12. Another end portion of the hinge member 28 is rotatably coupled to the floor panel 24 via the base portion 26. The hinge member 28 includes a base side attachment portion 30 and a cushion side attachment portion 32.

A plate thickness direction of the base side attachment portion 30 is in the seat width direction. In the state in which the seat main body 11 is unfolded, the base side attachment portion 30 extends diagonally toward the seat upper-front side, from the base portion 26 to the seat cushion 12. An insertion hole 30A is formed in a lower end portion of the base side attachment portion 30 (the end portion at the side thereof at which the base portion 26 is disposed). The hinge member 28 is rotatably pivoted at the base portion 26 by a rotation axis member, which is not shown in the drawings, being inserted into the insertion hole 30A.

The cushion side attachment portion 32 is formed integrally with the base side attachment portion 30. The cushion side attachment portion 32 includes an inclined portion 32A and a linear portion 32B. Viewed in the vehicle width direction, the inclined portion 32A extends diagonally toward the seat upper-front side. The linear portion 32B extends toward the seat front side from an upper end portion of the inclined portion 32A.

The inclined portion 32A projects to the seat width direction outer side from a seat rear side end portion of the base side attachment portion 30. The linear portion 32B extends along the lower face of the seat cushion 12. The linear portion 32B is fastened to the seat cushion 12 by a fastening member that is not shown in the drawings.

A cut-out 30B is formed in an end portion of the hinge member 28 at the side thereof at which the seat cushion 12 is disposed. More specifically, viewed in the seat width direction, the cut-out 30B is formed in a shape in which an upper end portion of the base side attachment portion 30 is cut away in a substantially triangular shape. The upper portion of the hinge member 28 is structured as a weakened portion 28A by the cut-out 30B. Hence, the weakened portion 28A at the upper portion of the hinge member 28 is easier to deform than other portions of the hinge member 28.

Figure 4:
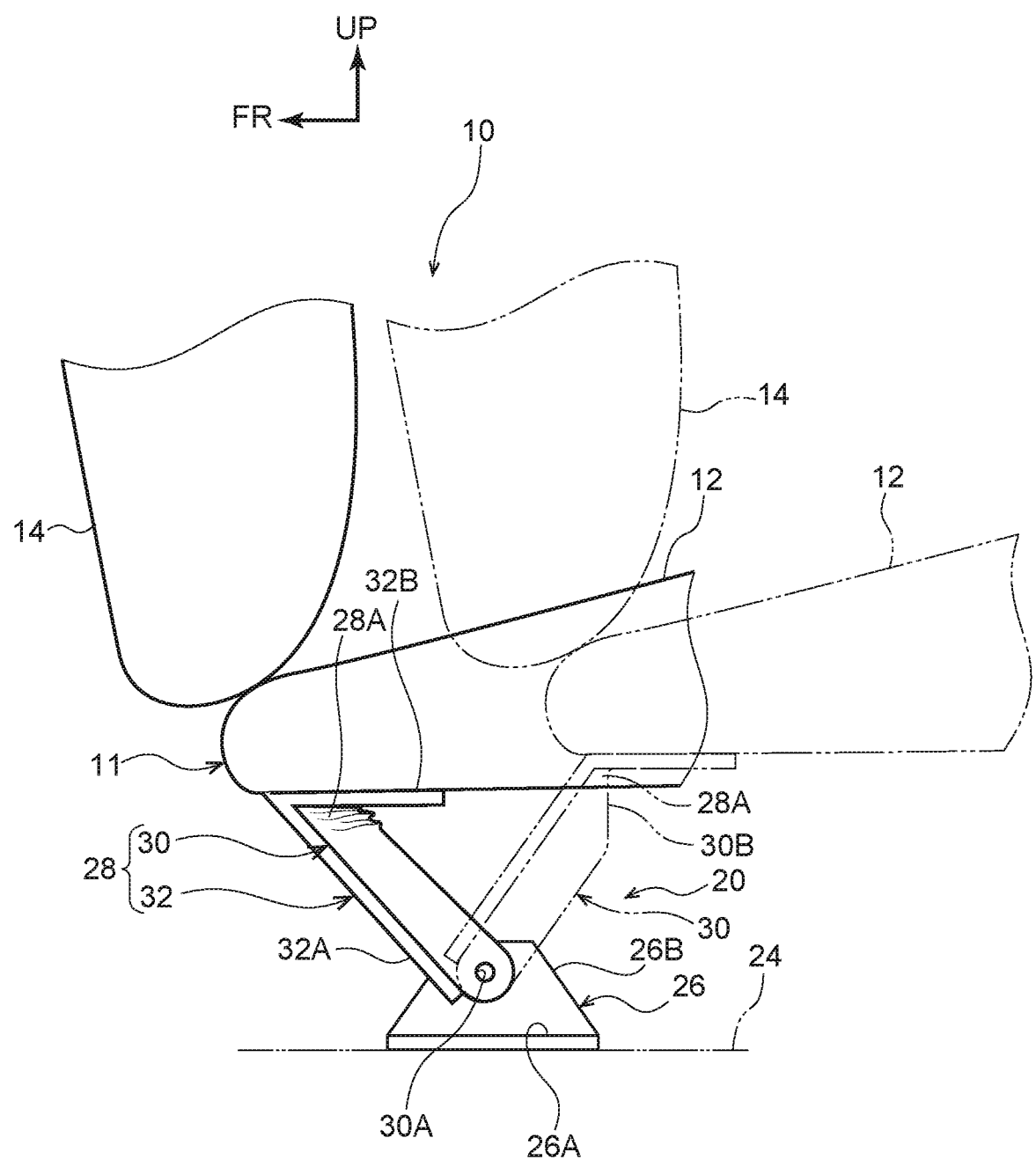
FIG. 4 is a magnified side view, corresponding with FIG. 3, showing a state in which a hinge member of the vehicle seat according to the first exemplary embodiment is plastically deformed.

Now, a situation in which a vehicle front collision occurs in the state in which the seat main body 11 is unfolded is described. When the vehicle front collision occurs in the state shown in FIG. 1, a collision load toward the vehicle front side is applied to the seat cushion 12. As a result, as shown in FIG. 4, the weakened portion 28A at the upper portion of the hinge member 28 is plastically deformed while the hinge member 28 is rotated toward the vehicle front side.

Figure 5:
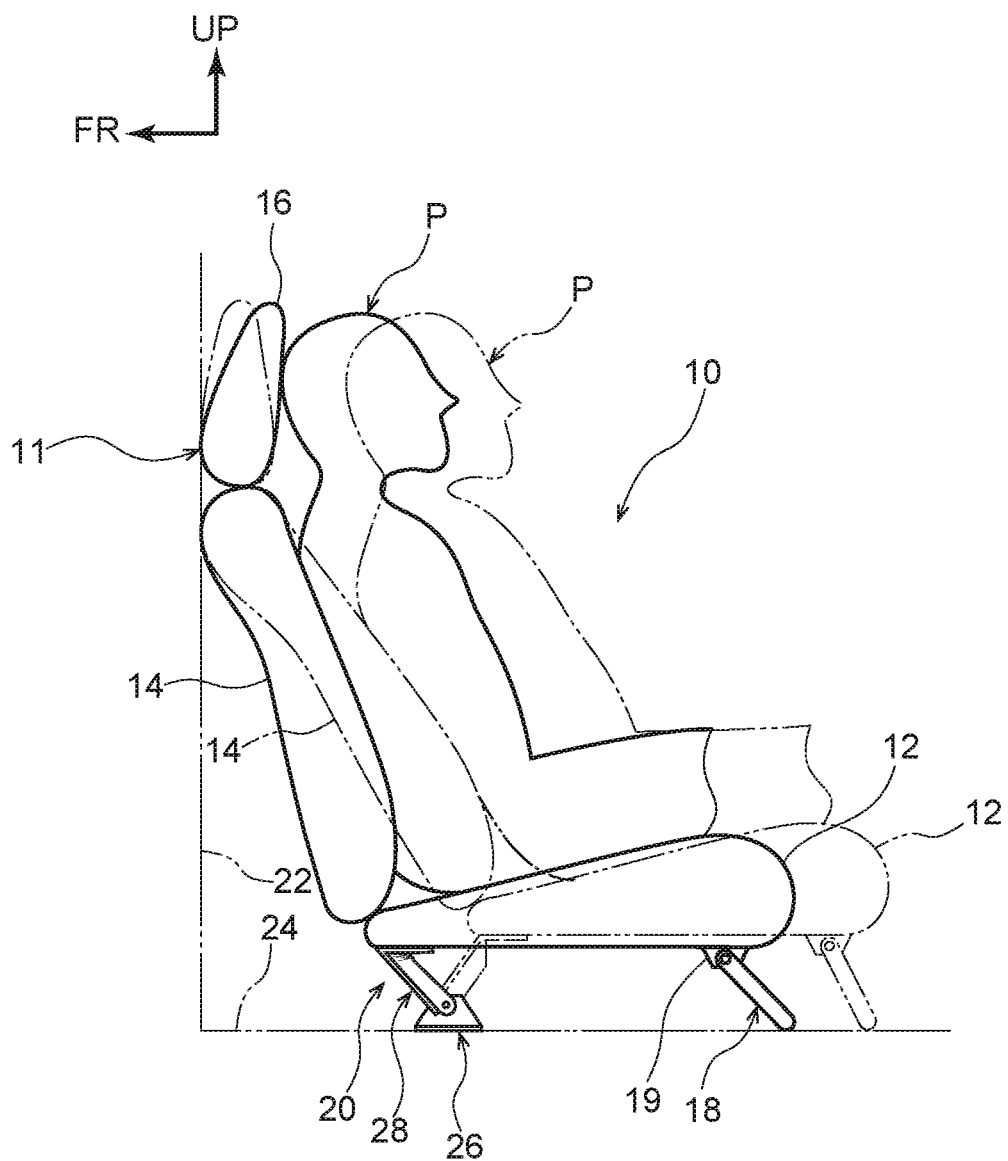
FIG. 5 is a side view, corresponding with FIG. 1, showing the state in which the hinge member of the vehicle seat according to the first exemplary embodiment is plastically deformed.

Movement of the seat cushion 12 toward the vehicle front side is allowed by the hinge member 28 rotating toward the vehicle front side. Consequently, as shown in FIG. 5, the seat cushion 12 moves toward the vehicle front side. In association with the movement of the seat cushion 12 toward the vehicle front side, the seat back 14 goes from the state shown in FIG. 1 into an upright state along the vehicle body side vertical wall portion 22.

—Operation—

Now, operation of the present exemplary embodiment is described.

In the vehicle seat 10 according to the present exemplary embodiment, as shown in FIG. 1, the one end portion of the hinge member 28 is fixed to the seat cushion 12 and the another end portion of the hinge member 28 is rotatably coupled to the floor panel 24 via the base portion 26. Therefore, when the vehicle rear side end portion of the seat cushion 12 is lifted up, the another end portion of the hinge member 28 is rotated relative to the base portion 26 (and the floor panel 24), and the seat cushion 12 may be flipped up as illustrated in FIG. 2.

In the present exemplary embodiment, as shown in FIG. 3, the cut-out 30B is formed in the end portion of the hinge member 28 at the side thereof at which the seat cushion 12 is disposed, partially defining the weakened portion 28A that deforms more easily than other portions of the hinge member 28. Hence, when a front collision occurs in the state in which the seat main body 11 is unfolded, the weakened portion 28A of the hinge member 28 may plastically deform as illustrated in FIG. 4 and absorb at least a portion of a collision load.

When the hinge member 28 plastically deforms, as shown in FIG. 5, the seat main body 11 moves to the vehicle front side. Accordingly, the seat back 14 goes into the upright state along the vehicle body side vertical wall portion 22, and a case of the occupant P riding up along the seat back 14 toward the vehicle upper side may be suppressed. Therefore, at the vehicle seat 10 that is disposed in a state facing to the vehicle rear side, the occupant P may be effectively protected during a vehicle front collision.

In particular in the present exemplary embodiment, the weakened portion 28A is formed at the end portion of the hinge member 28 at the side at which the seat cushion 12 is disposed. Therefore, when the weakened portion 28A is plastically deformed during a front collision, the hinge member 28 bends from the side thereof at which the seat cushion 12 is disposed, and the seat cushion 12 may be more assuredly allowed to move toward the vehicle front side. That is, the seat cushion 12 may be allowed to move to the vehicle front side and the seat back 14 put into the upright state during a front collision by a simple structure in which the cut-out 30B is simply formed in the hinge member 28.

Second Exemplary Embodiment

Now, a vehicle seat 50 according to a second exemplary embodiment is described. Structures that are the same as in the first exemplary embodiment are assigned the same reference symbols and, as appropriate, are not described.

Figure 6A:
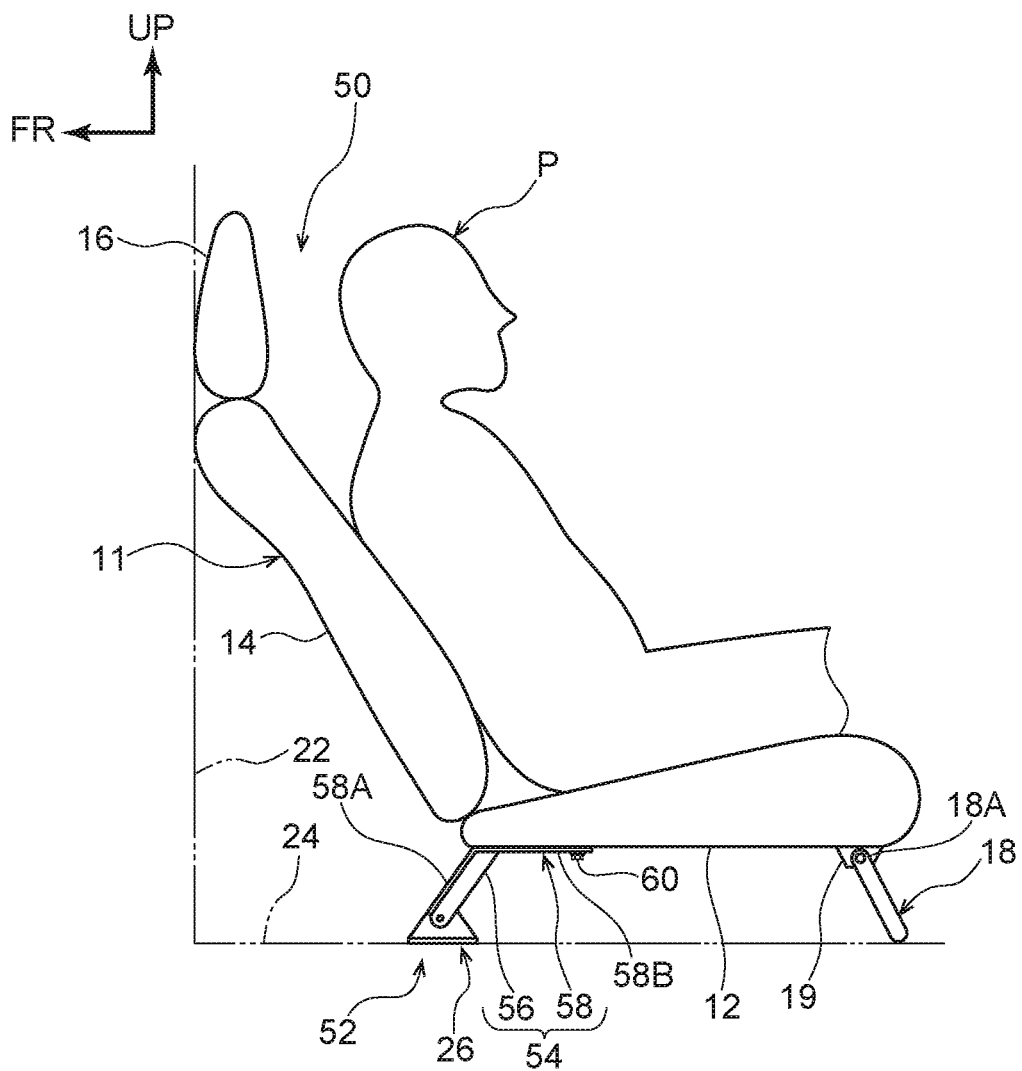
FIG. 6A is a view showing overall structure of a vehicle seat according to a second exemplary embodiment.

As shown in FIG. 6A, rear side leg members 52 are coupled to seat rear side end portions of the seat cushion 12 that structures the vehicle seat 50 according to the present exemplary embodiment. The rear side leg members 52 are provided as a pair at left and right, each including the base portion 26 and a hinge member 54.

Similarly to the first exemplary embodiment, one end portion of each hinge member 54 is fixed to a seat rear side end portion the of the seat cushion 12, and another end portion of the hinge member 54 is rotatably coupled to the floor panel 24 via the base portion 26. The hinge member 54 includes a base side attachment portion 56 and a cushion side attachment portion 58.

A plate thickness direction of the base side attachment portion 56 is in the seat width direction. In the state in which the seat main body 11 is unfolded, the base side attachment portion 56 extends diagonally toward the seat upper-front side, from the base portion 26 to the seat cushion 12. A lower end portion of the base side attachment portion 56 is rotatably pivoted at the base portion 26. The present exemplary embodiment differs from the first exemplary embodiment in that no cut-out is formed in the upper end portion of the base side attachment portion 56.

The cushion side attachment portion 58 is formed integrally with the base side attachment portion 56. The cushion side attachment portion 58 includes an inclined portion 58A and a linear portion 58B. The inclined portion 58A extends diagonally toward the seat upper-front side. The linear portion 58B extends toward the seat front side from an upper end portion of the inclined portion 58A.

The inclined portion 58A projects to the seat width direction outer side from a seat rear side end portion of the base side attachment portion 56. The linear portion 58B extends along the lower face of the seat cushion 12.

Figure 6B:
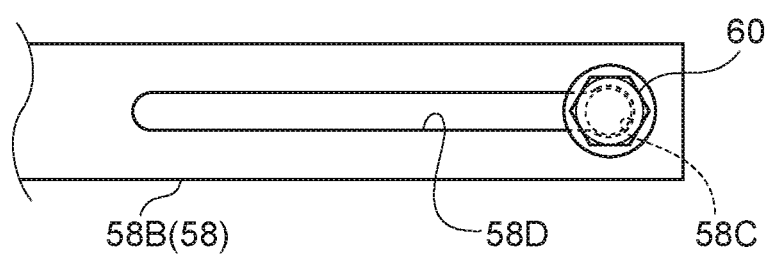
FIG. 6B is a magnified view of principal portions, in which principal portions of a hinge member shown in FIG. 6A are viewed from the vehicle lower side.

As shown in FIG. 6B, an insertion hole 58C is formed in the linear portion 58B of the cushion side attachment portion 58. A bolt 60 that serves as a fastening member is inserted into the insertion hole 58C from the vehicle lower side thereof. The bolt 60 is screwed into a cushion frame, which is not shown in the drawings, that structures the lower face of the seat cushion 12. The cushion side attachment portions 58 are fastened to the seat cushion 12 by the bolts 60.

In addition, a long hole 58D is formed in each cushion side attachment portion 58. The long hole 58D extends toward the seat rear side (the vehicle front side) from the insertion hole 58C. A seat front side end portion of the long hole 58D is continuous with the insertion hole 58C.

A slot width of the long hole 58D is narrower than the insertion hole 58C. That is, the long hole 58D is formed to be narrower than a shaft body of the bolt 60 that is inserted into the insertion hole 58C. Thus, the bolt 60 does not enter into the long hole 58D at usual times in the state in which the seat main body 11 is unfolded.

The vehicle seat 50 according to the present exemplary embodiment is structured as described above. Thus, when a vehicle front collision occurs in the state in which the seat main body 11 is unfolded, a collision load toward the vehicle front side is applied to the seat cushion 12. As a result, as shown in FIG. 7B, the bolt 60 moves toward the vehicle front side while pushing to widen the long hole 58D in opposition to a holding force of the long hole 58D. In other words, the cushion side attachment portion 58 is plastically deformed by the shaft body of the bolt 60. Thus, movement of the seat cushion 12 toward the vehicle front side is allowed.

Figure 7A:
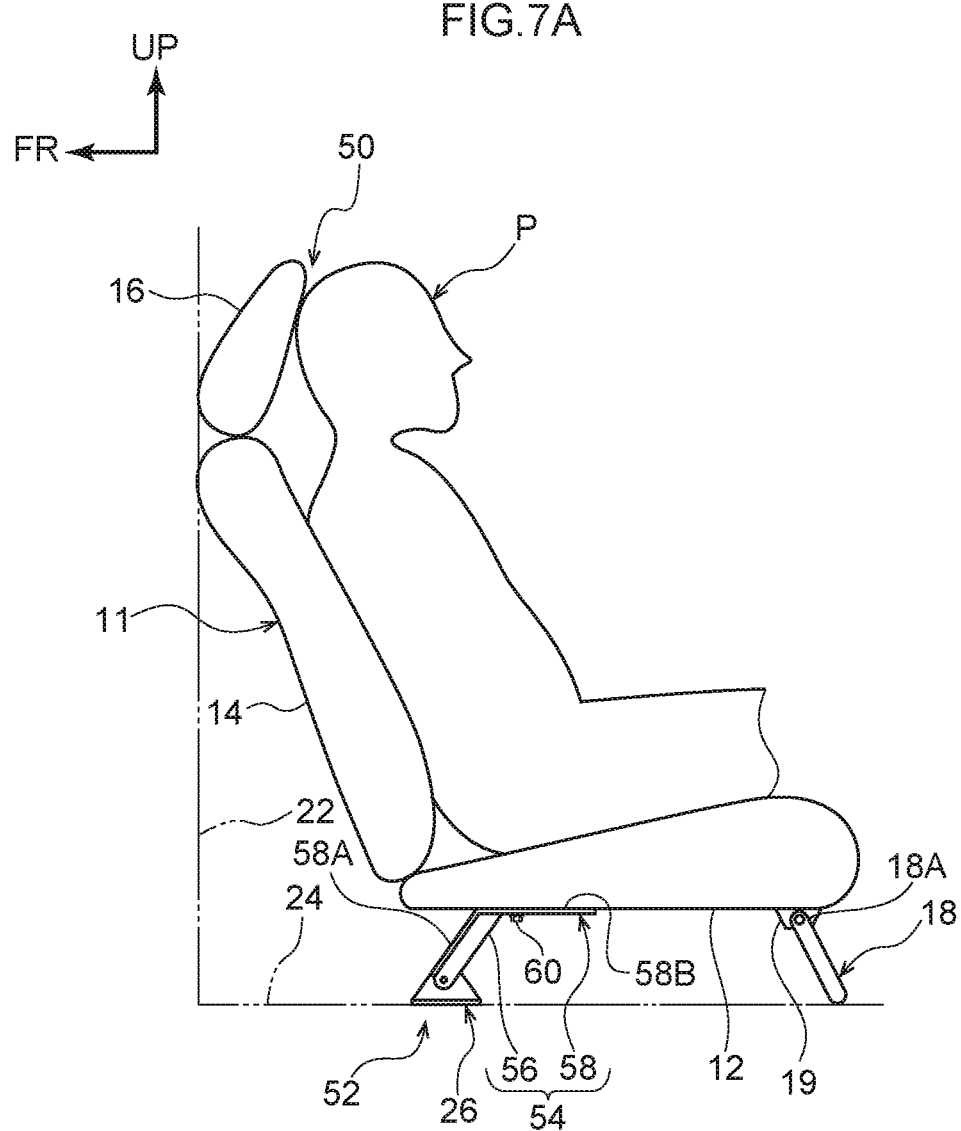
FIG. 7A is a view showing overall structure of the vehicle seat according to the second exemplary embodiment in a state in which the hinge member of the vehicle seat is plastically deformed.
Figure 7B:
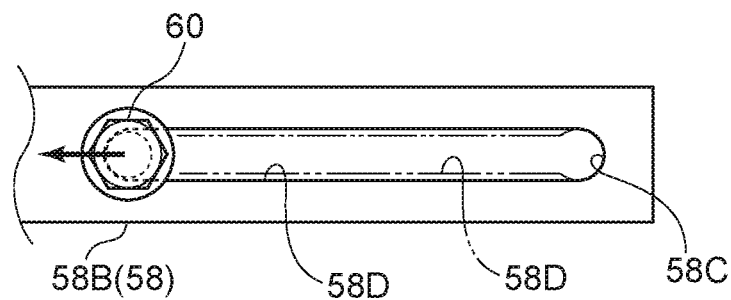
FIG. 7B is a magnified view of principal portions, in which the principal portions of the hinge member shown in FIG. 7A are viewed from the vehicle lower side.

As shown in FIG. 7A, when the seat cushion 12 moves to the vehicle forward side together with the bolt 60 relative to the hinge member 54, the seat back 14 goes from the state shown in FIG. 6A into an upright state along the vehicle body side vertical wall portion 22.

—Operation—

Now, operation of the present exemplary embodiment is described.

In the vehicle seat 50 according to the present exemplary embodiment, the seat cushion 12 may be allowed to move toward the vehicle front side during a vehicle front collision by a simple structure in which the long hole 58D is simply formed in the cushion side attachment portion 58 of each hinge member 54. Other operations are the same as in the first exemplary embodiment.

Hereabove, the first exemplary embodiment and second exemplary embodiment are described, but it will be clear that numerous embodiments are possible within a scope not departing from the gist of the present disclosure. For example, in the first exemplary embodiment as shown in FIG. 3, the weakened portion 28A is formed by the cut-out 30B formed in the hinge member 28, but this is not limiting. The weakened portion 28A may be formed by an alternative structure. The weakened portion 28A may be formed by reducing the thickness of a portion of the base side attachment portion 30 of the hinge member 28 in FIG. 3. Alternatively, the weakened portion 28A may be formed by replacing the material of a portion of the base side attachment portion 30 with a material that is easier to deform.

A location at which the cut-out 30B is formed is not particularly limited. For example, the cut-out 30B may be formed in an intermediate region between one end portion and the other end portion of the base side attachment portion 30 of the hinge member 28. However, with a view to consistent plastic deformation of the hinge member 28, in some embodiments, the cut-out 30B may be formed at the end portion of the hinge member 28 at the side thereof at which the seat cushion 12 is disposed.

What is claimed is:

1. A vehicle seat comprising:
a seat main body that is disposed in a state facing a vehicle rear side, a seat back of the seat main body being attached to a vehicle body side vertical wall portion of a passenger compartment front portion, and a vehicle rear side end portion of a seat cushion of the seat main body being capable of being flipped up; and
a hinge member of which one end portion is fixed to a vehicle front side end portion of the seat cushion and another end portion is rotatably coupled to a passenger compartment floor portion, the hinge member, during a vehicle front collision in a state in which the seat main body is unfolded, plastically deforming and allowing movement of the seat cushion toward the vehicle front side.

2. The vehicle seat according to claim 1, wherein a weakened portion is formed at an upper portion of the hinge member, the weakened portion being easier to deform than other portions of the hinge member.

3. The vehicle seat according to claim 2, wherein the weakened portion is partially defined by a cut-out formed in the upper portion of the hinge member.

4. The vehicle seat according to claim 2, wherein, during a vehicle front collision of the vehicle in the state in which the seat main body is unfolded, the hinge member rotates toward the vehicle front side, plastically deforms at the weakened portion, and allows movement of the seat cushion toward the vehicle front side.

5. The vehicle seat according to claim 2, further comprising a base portion fixed to the passenger compartment floor portion, wherein the hinge member includes:
a cushion side attachment portion that is fixed to the seat cushion; and
a base side attachment portion that is rotatably coupled to the passenger compartment floor portion, via the base portion.

6. The vehicle seat according to claim 5, wherein the base side attachment portion extends diagonally toward a vehicle upper-rear side from the base portion to the seat cushion, and the weakened portion is provided at an upper end portion of the base side attachment portion.

7. The vehicle seat according to claim 6, wherein the cushion side attachment portion includes:
an inclined portion that projects in a vehicle width direction from a vehicle front side end portion of the base side attachment portion and extends in a direction of extension of the base side attachment portion; and
a linear portion that extends to the vehicle rear side along a lower face of the seat cushion from an upper end portion of the inclined portion.

8. The vehicle seat according to claim 2, wherein the weakened portion is a region with reduced thickness that is provided at the upper portion of the hinge member.

9. The vehicle seat according to claim 1, wherein:
an insertion hole and a long hole are formed in the one end portion of the hinge member, at the side thereof at which the seat cushion is disposed, a fastening member being inserted into the insertion hole and fastening the hinge member to the seat main body, and the long hole extending toward the vehicle front side from the insertion hole and being narrower than the fastening member; and
during a front collision of the vehicle, the hinge member is plastically deformed due to the long hole being widened by the fastening member moving toward the vehicle front side, and the hinge member allows movement of the seat cushion toward the vehicle front side.

10. A vehicle seat comprising:
a seat main body that is disposed in a state facing a vehicle rear side, a seat back of the seat main body being attached to a vehicle body side vertical wall portion of a passenger compartment front portion, and a vehicle rear side end portion of a seat cushion of the seat main body being capable of being flipped up; and
a hinge member of which one end portion is fixed to a vehicle front side end portion of the seat cushion and another end portion is rotatably coupled to a passenger compartment floor portion, the hinge member, during a vehicle front collision in a state in which the seat main body is unfolded, plastically deforming and allowing movement of the seat cushion toward the vehicle front side,
wherein the seat back moves into an upright state along the vehicle body side vertical wall portion in response to the vehicle rear side end portion of the seat cushion of the seat main body being flipped up.

11. The vehicle seat according to claim 10, wherein a weakened portion is formed at an upper portion of the hinge member, the weakened portion being easier to deform than other portions of the hinge member.

12. The vehicle seat according to claim 11, wherein the weakened portion is partially defined by a cut-out formed in the upper portion of the hinge member.

13. The vehicle seat according to claim 11, wherein, during a vehicle front collision of the vehicle in the state in which the seat main body is unfolded, the hinge member rotates toward the vehicle front side, plastically deforms at the weakened portion, and allows movement of the seat cushion toward the vehicle front side.

14. The vehicle seat according to claim 11, further comprising a base portion fixed to the passenger compartment floor portion, wherein the hinge member includes:
a cushion side attachment portion that is fixed to the seat cushion; and
a base side attachment portion that is rotatably coupled to the passenger compartment floor portion, via the base portion.

15. The vehicle seat according to claim 14, wherein the base side attachment portion extends diagonally toward a vehicle upper-rear side from the base portion to the seat cushion, and the weakened portion is provided at an upper end portion of the base side attachment portion.

16. The vehicle seat according to claim 15, wherein the cushion side attachment portion includes:
an inclined portion that projects in a vehicle width direction from a vehicle front side end portion of the base side attachment portion and extends in a direction of extension of the base side attachment portion; and
a linear portion that extends to the vehicle rear side along a lower face of the seat cushion from an upper end portion of the inclined portion.

17. The vehicle seat according to claim 11, wherein the weakened portion is a region with reduced thickness that is provided at the upper portion of the hinge member.

18. The vehicle seat according to claim 10, wherein:
an insertion hole and a long hole are formed in the one end portion of the hinge member, at the side thereof at which the seat cushion is disposed, a fastening member being inserted into the insertion hole and fastening the hinge member to the seat main body, and the long hole extending toward the vehicle front side from the insertion hole and being narrower than the fastening member; and during a front collision of the vehicle, the hinge member is plastically deformed due to the long hole being widened by the fastening member moving toward the vehicle front side, and the hinge member allows movement of the seat cushion toward the vehicle front side.

19. A vehicle seat comprising:

a seat main body that is disposed in a state facing a vehicle rear side, a seat back of the seat main body being attached to a vehicle body side vertical wall portion of a passenger compartment front portion, and a vehicle rear side end portion of a seat cushion of the seat main body being capable of being flipped up; and a hinge member of which one end portion is fixed to a vehicle front side end portion of the seat cushion and another end portion is rotatably coupled to a passenger compartment floor portion, the hinge member, during a vehicle front collision in a state in which the seat main body is unfolded, plastically deforming and allowing movement of the seat cushion toward the vehicle front side, wherein the vehicle body side vertical wall portion includes a dash panel.

20. The vehicle seat according to claim 19, wherein a weakened portion is formed at an upper portion of the hinge member, the weakened portion being easier to deform than other portions of the hinge member.

\* \* \* \* \*